United States Patent
Bernard

[11] Patent Number: 5,850,108
[45] Date of Patent: Dec. 15, 1998

[54] FLUID FLOW POWER GENERATION SYSTEM WITH FOIL

[76] Inventor: Samuel Bernard, 665 Netherton Crescent, Mississauga, Ontario, Canada, L4Y 2M5

[21] Appl. No.: 725,475

[22] Filed: Oct. 4, 1996

[51] Int. Cl.⁶ ............... F03B 13/00; H02P 9/04
[52] U.S. Cl. ............... 290/54; 290/42; 290/43; 290/44; 290/53; 290/55
[58] Field of Search ............... 290/42, 43, 44, 290/53, 54, 55

[56] References Cited

U.S. PATENT DOCUMENTS

| | | | |
|---|---|---|---|
| 4,247,253 | 1/1981 | Seki et al. | 416/44 |
| 4,314,160 | 2/1982 | Boodman et al. | 290/54 |
| 4,383,801 | 5/1983 | Pryor | 416/17 |
| 4,437,698 | 3/1984 | Tantalo | 290/54 |
| 4,477,040 | 10/1984 | Karanik | 244/58 |
| 4,504,192 | 3/1985 | Cyrus et al. | 416/41 |
| 4,921,061 | 5/1990 | Arreola, Jr. | 290/55 |
| 5,296,746 | 3/1994 | Burkhardt | 290/55 |
| 5,512,788 | 4/1996 | Berenda et al. | 290/55 |

FOREIGN PATENT DOCUMENTS

| | | | |
|---|---|---|---|
| 901327 | 4/1985 | Belgium | 290/54 |
| 2 435 613 | 9/1978 | France | 290/54 |
| 3518516 A1 | 11/1986 | Germany | 290/54 |

Primary Examiner—Nestor Ramirez
Assistant Examiner—Elvin G. Enad

[57] ABSTRACT

A fluid flow power generating system is disclosed. The system includes a foil for accelerating the velocity of a fluid flow past said foil, to increase the fluid's kinetic energy. A turbine is located downstream of the foil, and at least partially behind the foil, and the turbine is driven by the fluid. The foil shields the upwind side of the turbine. A generator is also connected to the turbine for generating electrical energy. The turbine is mounted relative to the foil, so the position of the turbine relative to said foil can be adjusted to expose more or less of the turbine to the fluid flow. In one embodiment there are provided a plurality of individual systems which form a tower.

15 Claims, 4 Drawing Sheets

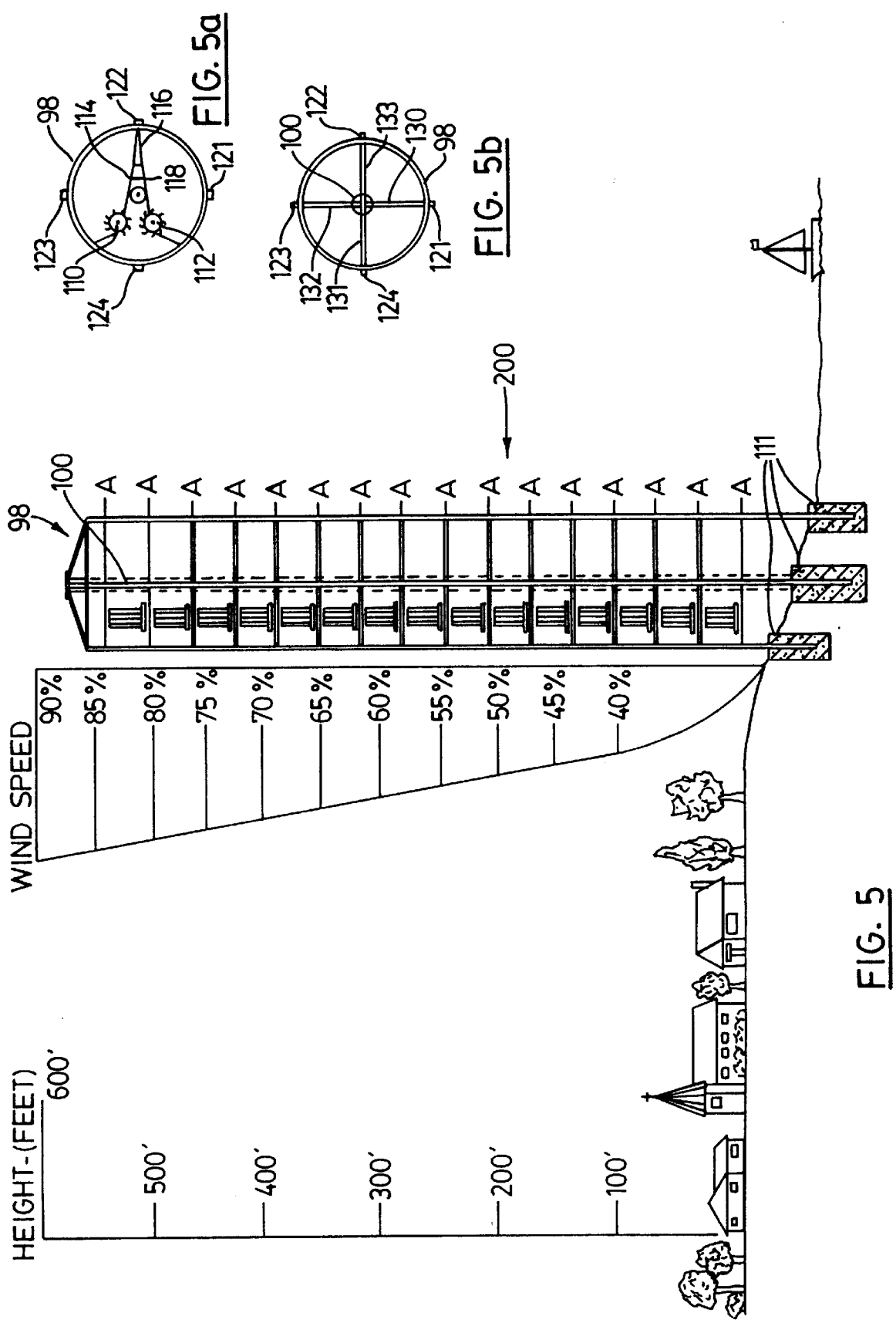

FLUID FLOW POWER GENERATION SYSTEM WITH FOIL

FIELD OF THE INVENTION

This invention relates to power generation and more particularly relates to energy generation from a moving fluid, such as air (wind) or water.

BACKGROUND OF THE INVENTION

Wind power is being recognized as an important source of renewable energy. Numerous different types of windmill structures have been developed in the past for the purpose of utilizing wind power to generate energy such as electricity. However, in the past, maximum utilization of wind power has not been effected. One of the problems is maintenance. Each wind power station strives to utilize large scale wind power units, since larger units will require about the same maintenance per unit as smaller ones. However, these large units tend to take the form of single large horizontal axis propellers, which are organized in a grid fashion in a so called "wind farm". Such wind farms are unattractive and take up much space. Unfortunately, the places with good winds (shore lines and the like) also tend to be naturally scenic and there is a growing resistance to covering large acreages with propellers to form such a "wind farm".

Water power is also a source of energy. However, designs of energy absorbing devices for water have had various defects.

SUMMARY OF THE INVENTION

The present invention is directed to a fluid flow power generation system with a foil for the purpose of generating power to supply energy. The system consists of a foil to modify the fluid flow and which may be adjusted having regard to wind or water direction, and at least one turbine, to be driven by the fluid flowing around the foil, and which turbine is adjustable relative to the foil. In this sense turbine will be understood to comprehend any suitable structure for converting a fluid stream (air or water) velocity into useful energy, such as electricity.

By use of the air foil, having regard to the Bernoulli principle known as the "Law of Continuity", a flow of fluid can be accelerated by passing over the curved surface of the air foil. By means of such acceleration, the velocity of the air or water or other fluid past the turbines can be controlled and, the speed of the turbines can be increased, thereby enhancing the efficient utilization of the wind or water energy.

It is an object of the present invention to reduce the amount of acreage required by horizontal axis propeller wind farms, through the use of vertical axis turbines.

It is a further object of the present invention to improve the durability of the turbines by partly sheltering the turbine in an enclosure.

It is a further object of the present invention to improve the efficiency of the turbine by shielding the upwind or counter-rotating side of the turbine from the fluid passing and driving the turbine.

By moving the turbine relative to the end of the foil, more or less of the turbine can be exposed to the accelerated fluid flow developed by the foil, also enhancing the utilization of the energy contained in the moving fluid stream. By varying the camber (ie. degree or amount of bend) of the foil, the acceleration of the air stream, and thus the velocity past the turbine, can also be varied and controlled to maximize velocity to a preferred one having an optional power output. In this sense, optimal power output will be understood to be the lowest velocity which still produces the necessary torque and turbine velocity for optimal power generation. Thus, at higher relative velocities (the speed of the fluid past the air foil system) a lower camber will be needed than at lower relative velocities. Further, at higher velocities, less of the turbine need be exposed to the fluid flow, to achieve the same power output. Exposing the turbine to excessive flow can create equipment damage and failure, and is undesirable. Alternatively, in lighter flow, more velocity may be desired to achieve a reasonable power output.

BRIEF DESCRIPTION OF THE DRAWINGS

FIG. 5 is a view of a tower arrangement for land-based use of the airfoil system;

FIG. 5A is a side view of one segment of the system; and

FIG. 5B is a top view of some structural elements for the segment of FIG. 5A.

DETAILED DESCRIPTION OF THE PREFERRED EMBODIMENTS

Figure 1:
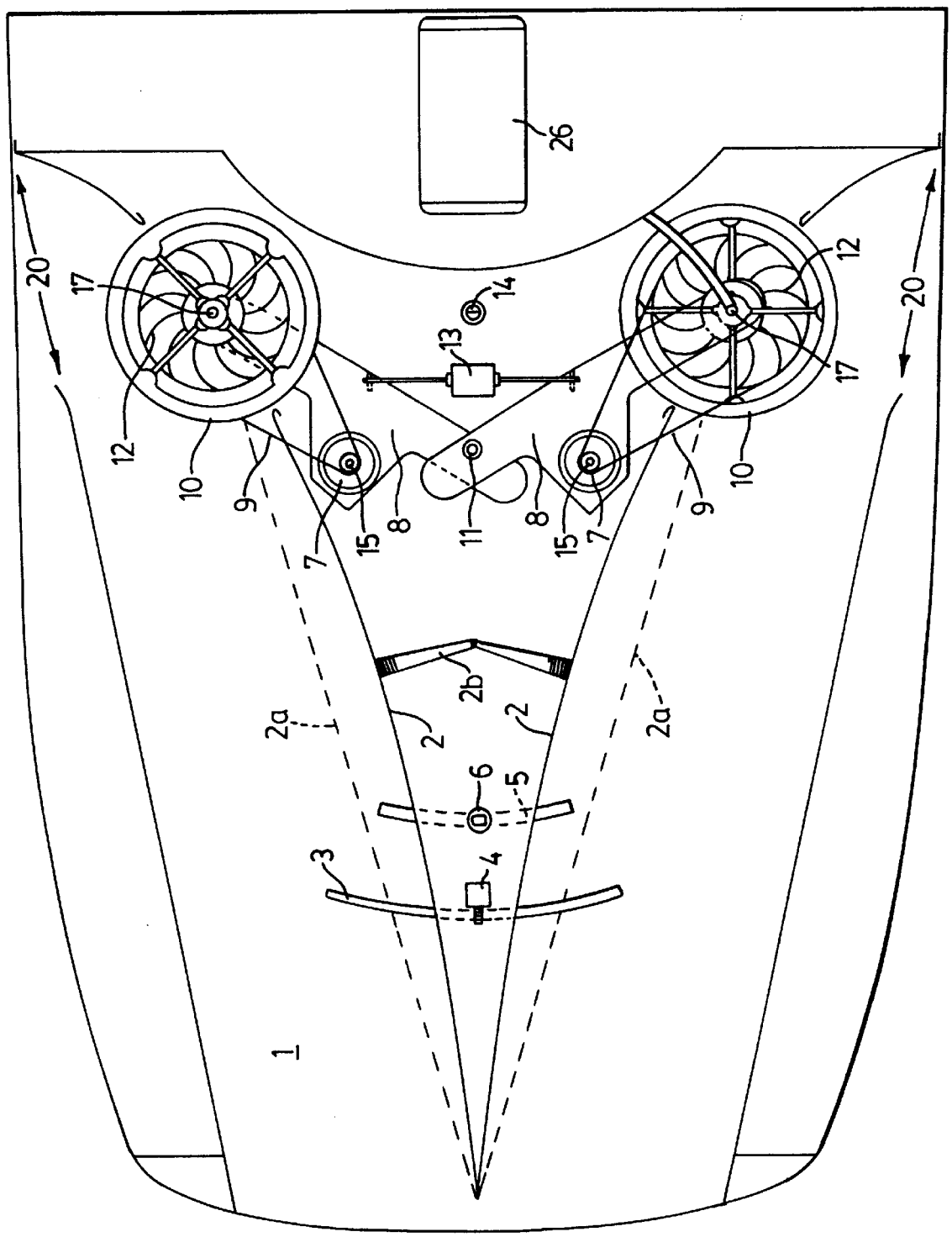
FIG. 1 is a top view of a fluid flow power generation system according to the present invention mounted on an automobile.

FIG. 1 shows the fluid flow power generating system mounted on a car according to the present invention. It is to be noted that the system may be mounted in any flow of moving fluid, either air or water, and that the mounting on a car is for illustration purposes only. The system includes a base plate 1 onto which is mounted a pair of opposed air foils 2. A track 3 is provided, together with an electric motor 4. A slot 5 is also provided, with a double headed bolt 6 extending between the air foil 2 and the base plate 1. Activation of the motor 4 permits the air foil to be directed laterally along the slot 5 so that the double headed bolt 6 slides within the slot 5.

A pair of generators 7, one associated with each turbine 12, are mounted on arms 8. A driving belt 9 extends between the generators 7 and the turbines 12. Mounted below the turbines 12 are flywheels 10.

Arms 8 interact at a pivot point or axle 11 to allow the turbines 12 to be adjusted relative to the air foil 2. Adjustment is accomplished by an electric motor 13 acting on a rod which extends between the electric motor 13 and the arms 8. By shortening the distance, (ie. the length of the rod) the turbines are moved together, while lengthening the distance extends the turbines further apart. The turbines are mounted on axle 17.

It can now be appreciated that the foregoing arrangement permits the turbines 12 to be extended or retracted more or less into the flow of air past air foil 2. Once past the turbine 12, the flow continues out opening 20. It can also be appreciated that the air foils 2 can be of variable camber, with the range being defined in part by dashed lines 2a. Varying the camber can be accomplished by any suitable means such as threaded actuator 2b, and may be either motor driver or even manually driven.

Figure 2:
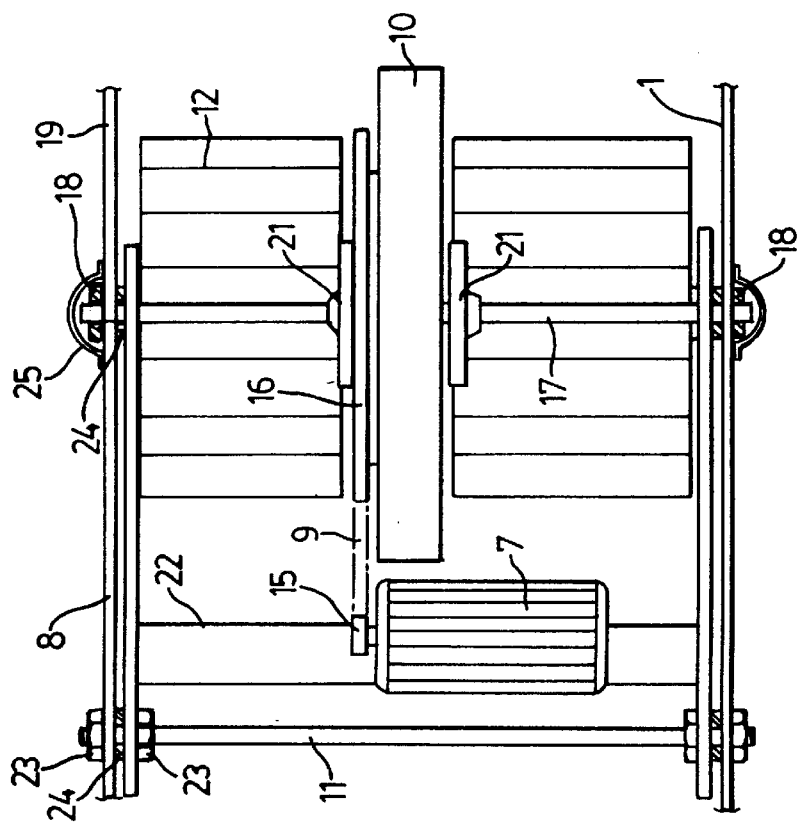
FIG. 2 is a side view of a portion of the system, showing a turbine system having a double clutch.

In FIG. 2 the base plate 1 is shown having the generator 7 mounted underneath the arm 8. The driving belt 9 is shown in dashed outline. The flywheel 10 is shown mounted between upper and lower turbines 12 and 12(*a*) on axle 17. A pulley 15 is provided on the top of the generator for the driving belt 9. A pulley and flywheel combination 16 are attached to the turbine 12 at the other end of the drive belt 9.

There are also provided bearings 18 for the turbine axle 17 as well as a top clutch plate 19 and a clutch and pressure plate 21. The top plate and clutch and pressure plate will be known to those skilled in the art and thus are not discussed in any more detail.

A metal brace 22 holds the assembly together, with the hold down nuts 23 on axle 17. Also provided are spacers 24 and grease cups 25.

Figure 3:
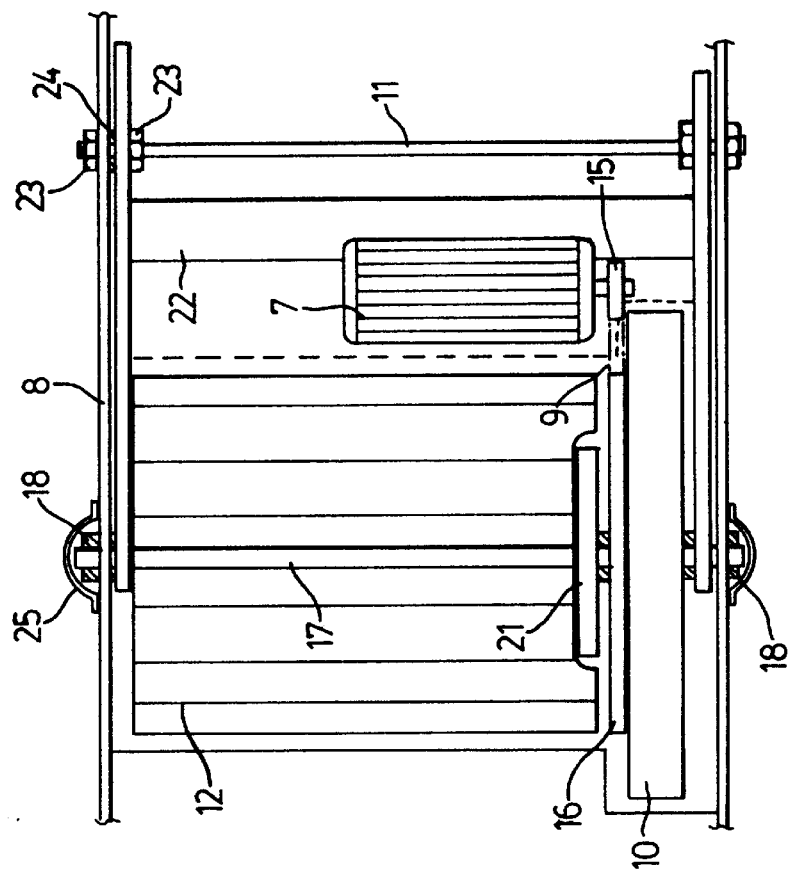
FIG. 3 is a side view of a turbine with a lower flywheel and a single clutch.

FIG. 3 shows an alternate embodiment of the turbine, in which like numerals as in FIG. 2 refer to like elements.

Figure 4:
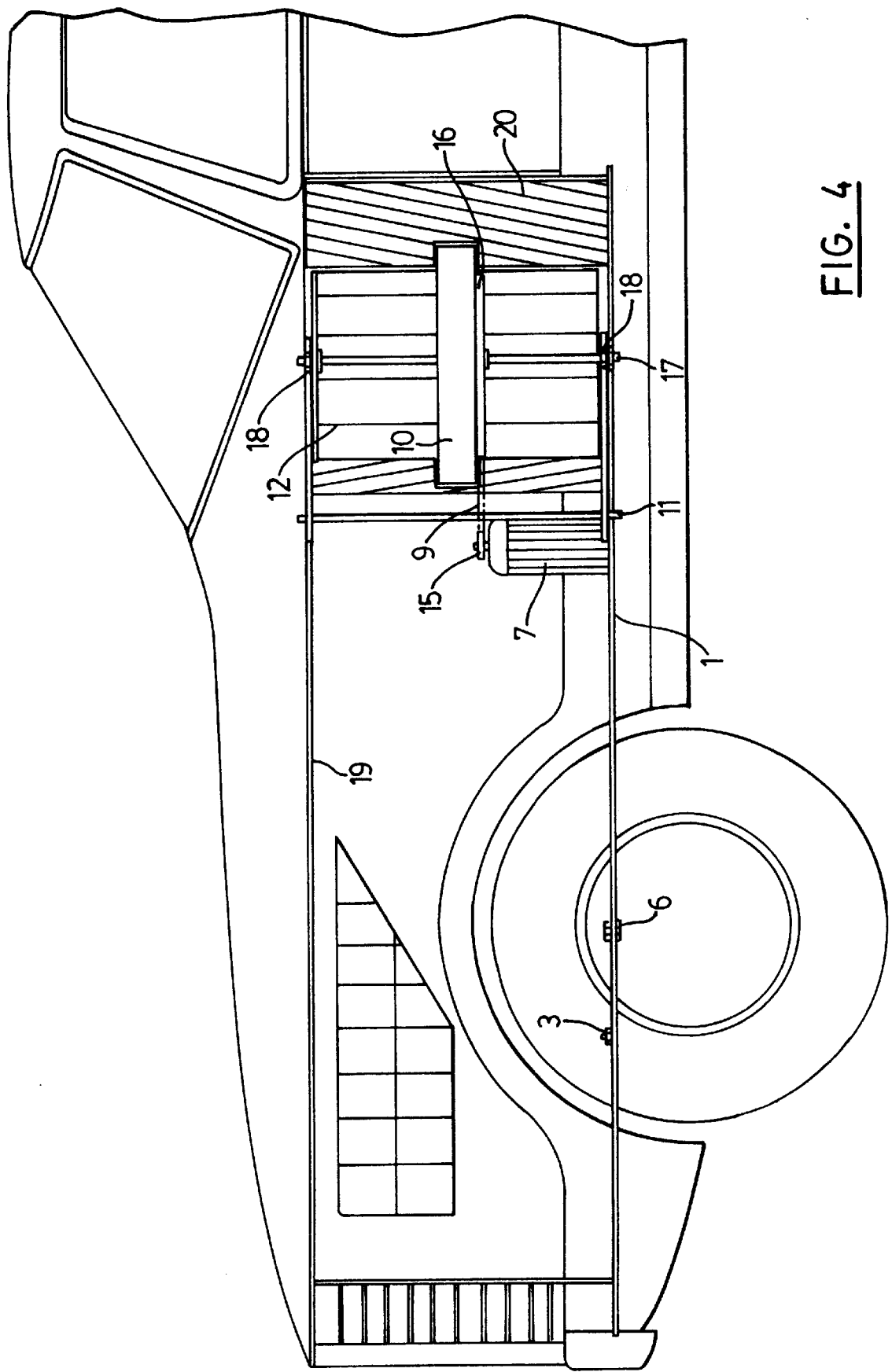
FIG. 4 is a side view of a car having the air foil system mounted thereon.

FIG. 4 is a side view of the vehicle mounted version of the invention. FIG. 4 includes a track base plate 1 with track 3. A double headed bolt 6 is also shown, as well as generators 7, driving belt 9 and flywheel 10. The pivoting point or axle 11 is shown as well as turbines 12 and pulleys 15 and 16. The side opening 20 is shown in side view.

It can now be appreciated how the present invention achieves certain advantages over the prior art. In the event that the fluid speed, either wind or water is high, the turbines can be adjusted inwardly, to reduce the degree of exposure of the turbine to the flow past the air foil. Conversely, when the flow of fluid is low, the turbines can be fully extended into the flow again to maximize the usable energy contained within the flow. The preferred range is from 50% exposed, to completely retracted. It will be appreciated by those skilled in the art that the fully retracted position is extremely useful in northern climates. In such climates, although frequent strong winds are experienced, the build up of snow and ice on the equipment tends to damage or impair the turbines. By being able to retract the turbines in inclement weather, it is believed that the system according to the present invention will have an extended life (and one with fewer maintenance problems) because the system is less adversely affected by the elements.

It will also be appreciated by those skilled in the art that the shielding of the upwind turning side of the turbine reduces the drag on the upwind side and allows the turbine to be more efficient, at lower wind speeds. Thus, the maximum desirable extended position is to have 50% of the turbine exposed. Also, by being able to vary the camber of the foil, the optimum fluid flow can be maintained as the fluid passes the turbine. The optimum fluid flow is one which will provide adequate torque to the turbine, without having unnecessarily high speeds which could damage or otherwise excessively wear the turbine components.

Although the preferred embodiment includes a flywheel, for the purpose of storage of rotational energy, it will be appreciated by those skilled in the art that the turbine could be directly connected to the generator, without use of the flywheel. The flywheel is merely an efficient way of storing some of the energy gathered by the turbine. This may be especially effective when the turbines are mounted on a vehicle, in order that the flywheels can continue to generate power even as the speed of the turbines slow down because of the vehicle slowing.

FIG. 5 shows an alternate embodiment of the fluid flow power generation system. In this embodiment the air foil system is suitable for use as a fixed wind power generator 98. In this embodiment, the system is shown mounted on a central axle 100. A plurality of air foils (A) are mounted one above the other, to form the wind driven power generating tower 98. The purpose of extending such a tower vertically is two fold, namely, to extend the air foils higher into the air and to increase the density, per area of ground of power generators. In this manner, since the wind speed generally increases with height (see FIG. 5 which shows the height on the left hand side and the percentage of wind speed at that height), more energy can be taken out of the air stream and converted to useful power. Further, by being more densely configured (one on top of another), less area is required, than is required for conventional horizontal axis propeller systems. In this case the tower is supported on concrete footings 111. The wind direction is shown as 200.

FIG. 5(A) shows a single power generating system which includes two turbines 110, 112, each partially behind an airfoil 114, 116 respectively. Also shown is an actuator 118, which can be moved to alter the camber of the foils 114, 116. Also shown is the central axle 100, as well as column supports 121, 122, 123 and 124.

FIG. 5(B) shows a cross-section through a supporting section with the axle 100, the supports, 121, 122, 123 and 124, and cross-support elements 1230, 131, 132 and 133.

It will appreciated by those skilled in the art that many different structural solutions are possible, and that the same will be satisfactory providing they are strong enough to hold up to the wind loads the tower is exposed to. Also, while reference is made to an axle 100, each segment A of the tower could be individually rotatable, or, the segments A could be locked together to rotate as one. Rotation is desirable to ensure the air foil of the system is pointing in the upwind direction as shown, regardless of the absolute compass direction of the wind.

By being mounted on the axle, the air foils will naturally, like a wind vane, seek the wind. In larger installations, the air foil may have to be moved along a track, by a motor or the like, to follow wind direction changes. Such direction can be manually adjusted, or it may be automatically adjusted by means of a wind vane sensor with an associated actuator or the like.

It will be appreciated that while reference herein is made to use of vertical axis turbines, other types of wind driven devices may also be employed. One of the key features of the present invention is to provide, in combination, an adjustable air foil system which responds to various conditions to optimize energy transfer and reduce equipment failure arising from extreme conditions. The adjustments may be made by a variable camber air foil, to modify the flow of the fluid to increase its speed, and kinetic energy. Some means to convert the kinetic energy of the fluid flow to some more useful form of energy such as electrical energy is also provided, and the means to convert the energy is adjustably mounted relative to the air foil. Thus the energy converting means, such as turbines, with associated generators can be variably deployed, relative to the air foil, with any desired optimal degree of exposure. For example, such turbines can be protected from freezing rain, hail, snow or other damaging precipitation in extreme conditions.

The power delivered by a ten tier air foil tower system would be determined by the size and height of both tower, rotor heights and angle of attack of the air foil. For example, a ten tier air foil tower comprised of 20' high by 6' diameter turbines with wind speeds of 8 to 30 miles per hour and a tower height of 300' with 4–30 kw generators per air foil (a total of 20 air foils per tower) could generate 2400 kw. On the other hand, a propeller driven wind turbine with a tower of 140' and an 86' diameter blade driving a 200 kw generator at the same wind speeds of 8 to 30 miles per hour would generate much less power.

Results would be that the air foil tower will generate up to 20 times the electrical energy, for the same surface area of wind farm.

Compare the above information with wind farms, one farm using propeller driven wind generators, and the other using air foil towers.

The wind farm using 2000 propeller wind generators of 200 kw each would need 250 acres of land (at 8 machines per acre). This field would produce 400,000 kw.

Using the air foil tower system and placing 160 towers at 8 towers per acre the total number of acres would be 20. The electrical power produced by this system on 20 acres would be 384,000 kw. On the other hand, if a farm of 250 acres were used then the total number of air foil towers could be 2000. The power produced would be 4,800,000 kw. This is a much greater density of power per surface area of wind farm. This calculation does not include extra power available through higher wind speeds at higher elevations.

To increase the net torque on the air foil turbines it is preferred to minimize the wind force on the upwind moving vane. Because of the air foil's aerodynamic shape and the ability of retracting the turbines into the air foil shielding of the upwind vane is achieved thereby reducing drag and result in an increase in tip speed. By introducing the curvature on the air foil (using Bernoulli equation and the Law of Continuity) the wind velocity is increased. The elements combined with a clutch and flywheel system allow more useable driving force which in turn leads to a higher energy from generators or the like.

While the foregoing description has primarily focused on a fluid power generating wind system, the concept is believed to be particularly applicable to water-based systems as well. More specifically, efficient low head hydro power generation may be achieved utilizing the same principle of an accelerating foil to drive a turbine. With respect to the wind powered system, the preferred embodiment is as shown in FIG. 5, namely, a tower of turbines and air foils mounted one upon the other to any desired height, although vehicle mounted systems are also comprehended.

I claim:

1. A fluid flow power generating system comprising:
    a foil for accelerating the velocity of a fluid flowing past said foil, to increase said fluid's kinetic energy, the foil being located on an upstream side of said system; and
    a turbine separate from said foil and being located downstream of said foil, and at least partially behind said foil, said turbine including vanes sized and shaped to be driven by said fluid;
    a generator, connected to said turbine for generating electrical energy; and
    an adjusting means, whereby a position of said turbine relative to said foil can be adjusted to position said turbine between a retracted position behind said foil to a more exposed position to expose more or less of said turbine to said fluid flow.

2. A fluid flow power generating system as claimed in claim 1, wherein said foil includes a camber, and said system includes a camber adjusting means, whereby said camber of said foil may be adjusted to optimize the energy produced.

3. A fluid flow power generating system as claimed in claim 1, wherein said turbine is a vertical axis turbine.

4. A fluid flow power generating system as claimed in claim 3, wherein said system comprises a plurality of turbines, and associated foils, mounted one above another in the form of a tower.

5. A fluid flow power generating system as claimed in claim 4, wherein said fluid is air, and said foils are pivotable, to accommodate changes in wind direction.

6. A fluid flow power generating system as claimed in claim 5, wherein said system includes an actuator to position said foils into said wind.

7. A fluid flow power generating system as claimed in claim 5, wherein said system further comprises a pair of foils, having opposite cambers, and a pair of turbines, each turbine located downstream and partially behind each foil.

8. A fluid flow power generating system as claimed in claim 7, wherein said system is mounted upon a vehicle.

9. A fluid flow power generating system as claimed in claim 5, wherein said system comprises a tower extending upwardly to a level having at least 60% of the prevailing wind speed.

10. A fluid flow power generating system as claimed in claim 5, wherein said system comprises a tower extending upwardly to a level having at least 80% of the prevailing wind speed.

11. A fluid flow power generating system as claimed in claim 1, wherein said adjusting means adjusts said turbines from a position fully behind said foil to an extended position wherein one half of said turbine is exposed to said fluid flow.

12. A fluid flow power generating system as claimed in claim 1, wherein said adjusting means adjusts said position of said turbines and in all positions a counter revolving portion of said turbine is shielded from said fluid flow.

13. A fluid flow power generating system as claimed in claim 1, further including a flywheel for storing rotational energy.

14. A fluid flow power generating system as claimed in claim 1, further including a means for converting DC electrical power into AC electrical power.

15. A fluid flow power generating system as claimed in claim 1 further including an enclosure, wherein said turbine may be retracted into said enclosure to substantially avoid inclement weather.

* * * * *